United States Patent [19]
Wirkala

[11] Patent Number: 5,232,310
[45] Date of Patent: Aug. 3, 1993

[54] OIL CONTAINMENT BOOM

[76] Inventor: Dana A. Wirkala, 93 East St., Duxbury, Mass. 02332

[21] Appl. No.: 905,685

[22] Filed: Jun. 29, 1992

Related U.S. Application Data

[63] Continuation-in-part of Ser. No. 636,551, Sep. 18, 1990, abandoned.

[51] Int. Cl.⁵ .............................................. E02B 15/04
[52] U.S. Cl. ...................................... 405/68; 405/63; 405/66; 405/70
[58] Field of Search ..................................... 405/63–72; 210/242.3, 923

[56] References Cited

U.S. PATENT DOCUMENTS

| | | | |
|---|---|---|---|
| 2,156,713 | 5/1939 | Whitcomb | 405/70 |
| 3,563,036 | 2/1971 | Smith et al. | 405/69 |
| 3,645,099 | 2/1972 | Saavedra | 405/66 |
| 3,783,622 | 1/1974 | Gambel | 405/64 |

FOREIGN PATENT DOCUMENTS

WO92/00422  1/1992  PCT Int'l Appl. ............. 405/66

Primary Examiner—Dennis L. Taylor

[57] ABSTRACT

An oil containment boom consists of sections each of which includes upper and bottom self supporting battens, oil impervious battens sealed thereto and to an inflatable chamber. The barriers and chambers of adjacent sections are sealed to a rod to which the ends of the battens of the sections are pivotally connected to provide flexible joints. End sections are connectable to establish an impoundment about an oil leaking ship. The joints are immobilized as the boom is formed with the adjacent ends of the ballasting battens at each joint defining a predetermined angular relationship with each other. The angular relationship may be 180° and the shaping of the boom made possible by the limited flexibility of the battens of the desired boom shape may be effected by having alternate joints held in an obtuse angular relationship. In preferred embodiments, the last of a series of sections to be deployed overboard having a manually operated valve in control of the pressurized cannister by which its chamber is inflated and the valves of the cannisters for inflating the other chambers each of a type opened by gas under pressure derived from a previously inflated chamber.

19 Claims, 9 Drawing Sheets

OIL CONTAINMENT BOOM

This application is a continuation-in-part of Ser. No. 07/636,551, filed Sep. 18, 1990 now abandoned.

FIELD OF INVENTION

This invention relates generally to oil containment booms, and more particularly to an improved oil containment boom which is easily and compactly stored on an oil transporting vessel, and which contains integral self inflation means.

BACKGROUND OF THE INVENTION

The benefits of rapid oil containment are apparent to all who have been, or are engaged in oil pollution clearance, as oil slicks emanating from a point source rapidly spread and splinter into subsidiary slicks. With increasing industrialization, the manufacture and transport of oil and petroleum products have correspondingly increased, leading to an increase in oil spills at sea and at port.

Although some docks now have a conventional oil boom ready to surround a vessel, should an operational spill occur during loading or discharging operations, it should be noted that these conventional booms need only contain a small quantity of oil since operational spills are generally rectified shortly after occurrence. But of even greater importance, there are no adequately sized booms immediately available to a vessel which has a casualty while transiting from sea inbound to berth, or a vessel coasting several miles offshore (i.e., from Maine to New York). The term "immediately available" is of definite importance since although some ports such as Valdez, Ak. now stock miles of boom in shoreside warehouses, one must reasonably assess the time period in which one could transport such a boom via barge to perhaps 50 miles away, and deploy such a boom about a vessel. Four to eight hours would probably be considered a quick response. These factors necessitate oil containment systems which can be deployed around an oil spill site as soon as possible if not immediately after the damage has occurred.

At the present time, large sea going tankers having storage capacities of a hundred thousand tons and more are employed in transporting liquid products such as crude oil or refined petroleum products. The liquid products constitute a dangerous pollution problem should they leak from the tanker since they have a density lower than sea water and will float and be spread over wide areas. These liquid products can cause a fire hazard in shipping lanes, and can seriously pollute and damage coastal areas both above and below the water. When an oil spill occurs it is highly desirable and environmentally imperative to confine the hazardous material to a relatively small area in order to facilitate their recovery or to facilitate neutralizing their pollution effects and the possibility of fire hazard. This requires that the environmentally hazardous liquid product confinement be initiated as soon as possible after the leak has occurred. To permit effective use, it is essential that the confining means be capable of withstanding the forces caused by the wave action of the open seas. Furthermore, it is desirable that the confining means be compact to facilitate on-board storage and/or easy handling for quick deployment around the leakage site. The need has arisen for an oil containment system which can be stored on the oil transporting vessel, and can be quickly deployed to surround the vessel in case of an oil spill.

This invention is concerned with an oil containment system which is specifically designed for the vessel on which it is to be carried, and deflatable to minimize storage space, as well as, being quickly deployable by the first vessel to reach the oil spill site or by the vessel's own lifeboats, or in the case of a tug and towed barge, the tug boat itself. It follows that any system that can be quickly and easily deployed around an oil spill, as well as requiring minimal storage space, will present a unique advancement of the art.

DESCRIPTION OF THE RELATED ART

The broad concept of oil containment booms is generally known. Floating barriers, known generally as oil containment booms, have been found to have great utility in containing and controlling oil slicks on bodies of water. The barriers usually include flotation elements having a depending liquid impervious skirt which, when deployed around or in a controlling position relative to oil floating on the water, provide means to contain or prevent the oil from spreading or moving into areas protected by the barrier.

Present art barriers generally utilize a solid material as the flotation medium since gas inflatable flotation elements are susceptible to puncture and/or deflation in the environment to which the barriers are normally subjected. However, solid material containing booms have drawbacks in that they require a great amount of storage and transportation space and the greater difficulty in manipulating the barrier during deployment, positioning and retrieval. Furthermore, bucause a solid flotation element will have a larger moment of inertia than an inflated flotation element of equivalent size, the solid flotation element is more resistant to movement and therefore less able to follow wave motion without slop over and, further, due to the lower freeboard of solid flotation elements, oil containment is less effective.

SUMMARY OF THE INVENTION

By the present invention, an improved oil containment boom is provided. The oil containment boom of the present invention is intended to be carried aboard the oil transporting vessel, such as an oil tanker or barge, in its deflated state. The dimensions of the boom, such as overall length and depth of boom would vary according to the total carrying capacity of the vessel. This would allow the boom to be capable of containing the total amount of oil which might be emitted from an oil tanker or barge in most given casualties, as the depth of the skirt of the present invention is far greater in order to enable it to actually "contain" a body of oil up to possibly 6 feet in depth, whereas existing booms only "corral" surface oil, letting the rest escape beneath their average 2-foot skirt. Having contained such a body of oil, the pollution strike force arriving several hours later could quickly pump off the surface of the liquid inside the boom into lightering vessels until the sea water below pushed its interface to the surface, and then skimmers could be used to finish off the cleanup.

The oil containment boom of the present invention consists of the number of sections required to surround a leaking tanker in a spaced relationship thereto such that, given the vertical dimensions of the sections, an impoundment is established which, ideally, equals approximately 25 percent of the volumetric capacity of the tanker, by way of example and not of limitation.

Each section includes a flexible, oil impermeable barrier in sheet form having an inflatable chamber extending lengthwise thereof and establishing upper and lower barrier portions. The sections are connected by a joint in a manner enabling the sections to be folded one on another for storage purposes.

Each such joint includes a rod to which the ends of adjacent barriers and chambers are sealed. Upper and lower self supporting battens secured to corresponding margins of each section have their ends pivotally connected to the ends of the rods. The lower or bottom battens of the boom sections are of a weight such that they function as ballasting battens while the upper or top battens are light and buoyant, and may, in use, be slightly flexed. When the boom is unfolded and placed overboard to surround the tanker with the chambers of the sections inflated, the sections are held vertically with the upper barrier portions above the water line established by the inflated chambers. The installed boom must be prevented from collapsing inwardly towards the vessel and be maintained in such spaced relationshp thereto as to establish an impoundment of adequate capacity.

In accordance with the invention, such collapse is prevented and a suitable vessel encircling disposition of the boom is established and maintained. For this purpose, each ballasting batten is provided with a holding portion at or adjacent one end which, at least when the boom is in use, extends beyond the adjacent flexible joint on the side of the boom which is disposed towards the vessel and engages the adjacent end of the ballasting batten of the other section connected to that joint to prevent collapsing pivoting of connected sections. With such a portion connected to such an adjacent batten, the sections of a joint are also prevented from swinging relative to each other in the opposite direction.

In order that the boom can be assembled about a vessel even though the joints can not function, the battens in accordance with one embodiment of the invention, are sufficiently flexible to enable the boom to be formed. In such a boom, the holding portions of the ballasting battens may be an extension at one end thereof and disposed and dimensioned to fit in a channel in the adjacent batten. When a holding portion is thus entered in a channel, a lock is employed to hold it therein and the two sections are held in alignment.

It will be appreciated that such protruding holding portions, if employed for each section, would prevent stowage of the boom sections in an accordian style and such portions are accordingly, used alternately with another type of holding portion in accordance with the invention. In that type, the holding portion is a slide held by one ballasting batten for movement from a retracted position into an advanced position straddling a joint and entrant of a lengthwise socket in the adjacent batten with a lock preventing accidental retraction.

With a boom in which resilient flexibility of the ballasting battens is not a factor, the ballasting battens of yet another type are used. These feature an angularly disposed portion straddling a hinged end thereof with the angular portion, when in contact with the proximate adjacent batten and when locked thereto establishes a wanted angular relationship less than 180° between the sections to which the straddled joint is common. As such holding portions can be employed only with alternate ballasting battens, slidable holding portions are also employed for the alternate battens.

Each section is provided with a device operable to inflate its chamber and it is preferred that such devices be both manually operable and operated by air under pressure. Each section has its inflatable chamber connected to the device by which the chamber of the adjacent section which will be or has been deployed overboard whereby any uninflated chambers of deployed sections can be inflated one after another.

Other objectives of the invention and the manner by which they are attained will be apparent from the accompanying drawings and specification and the claims.

BRIEF DESCRIPTION OF THE DRAWINGS

The accompanying drawings illustrate presently preferred embodiments of the invention

THE PREFERRED EMBODIMENTS

The oil containment boom illustrated by the drawings consists of that number of interconnected sections, generally indicated at 10, necessary to encircle a leaking tanker, generally indicated at 11, in such a spaced relationship thereto as to establish an impoundment adequate to contain a substantial percentage of the maximum cargo.

Each section 10 has a flexible barrier impervious to oil and shown as consisting of an upper portion 12 and a bottom section 13 with their proximate margins sealed to opposite central zones of an inflatable, oval flexible chamber 14. The chambers 14 are shown as portions of a length of oval tubing which may extend the full length of the boom or shorter lengths may be used for that purpose. Each length is separated by appropriately spaced partitions 14A with each partition having a sleeve 14B sealed thereto and dimensioned to accommodate a pivot rod 15.

Flexible joints, generally indicated at 16, between each two sections 10 include rods 15 to which the ends of the barriers of adjacent sections 10 are sealed. Sealed to the upper margin of each upper portion 12 is a self supporting buoyant batten 17 and a self supporting batten, generally indicated at 18 is sealed to the bottom margin of the bottom section 13. Each section 10 and the flexible joints 16 therefor are completed by connecting the battens 17 and 18 to the upper and lower ends of the rods 15. In the case of the battens 18, it is preferred that their ends be so formed as to establish hinges receptive of the rods 15 and while the upper battens 17 may be similarly hinged to the rods, it is not necessary to do so as long as their connections to the rods render the joints 16 between them flexible. While the battens may be rigid, in most embodiments they are resiliently yieldable to a limited extent when in use. The battens 18 serve as ballast for the sections 10 and when the chambers are inflated, the battens 18 hold the sections 10 and the rods 15 vertically.

An important feature of the invention is that the boom, when placed in service, is held against being collapsed inwardly towards the tanker 11 by the wind or ocean currents. As stated earlier, this is accomplished by employing a holding portion at one end of the ballasting batten 18 of one of the two sections 10 connected by each flexible joint 16 to straddle the joint and engage the adjacent ends of the ballasting batten 18 of the other section 10 connected by it either to prevent the two sections from pivoting or swinging relative one to the other towards the tanker 11 or to permit such swinging to a limited extent in order that the boom can surround the tanker 11 and establish an appropriately shaped impoundment. In either case, provision is also made to prevent the sections from swinging in the opposite direction.

In the embodiment of the invention illustrated by FIGS. 2-5, the battens 18 as well as the battens 17 are sufficiently flexible, to so bend as to enable the boom to be deployed about the tanker 11 in a proper manner with the joints 16 immobilized.

Figure 3:
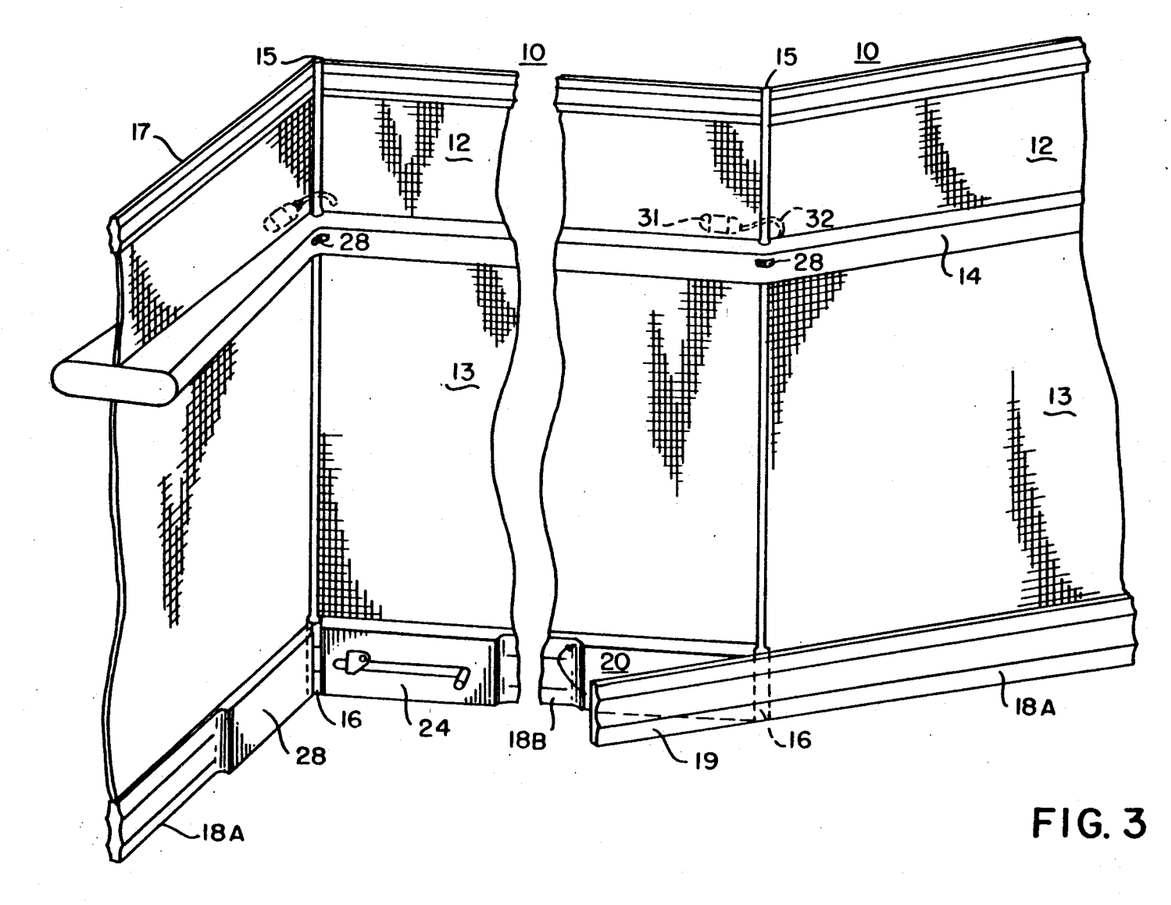
FIG. 3 is a like view taken from the inside of the boom with the sections free to swing.
Figures 4, 4A:
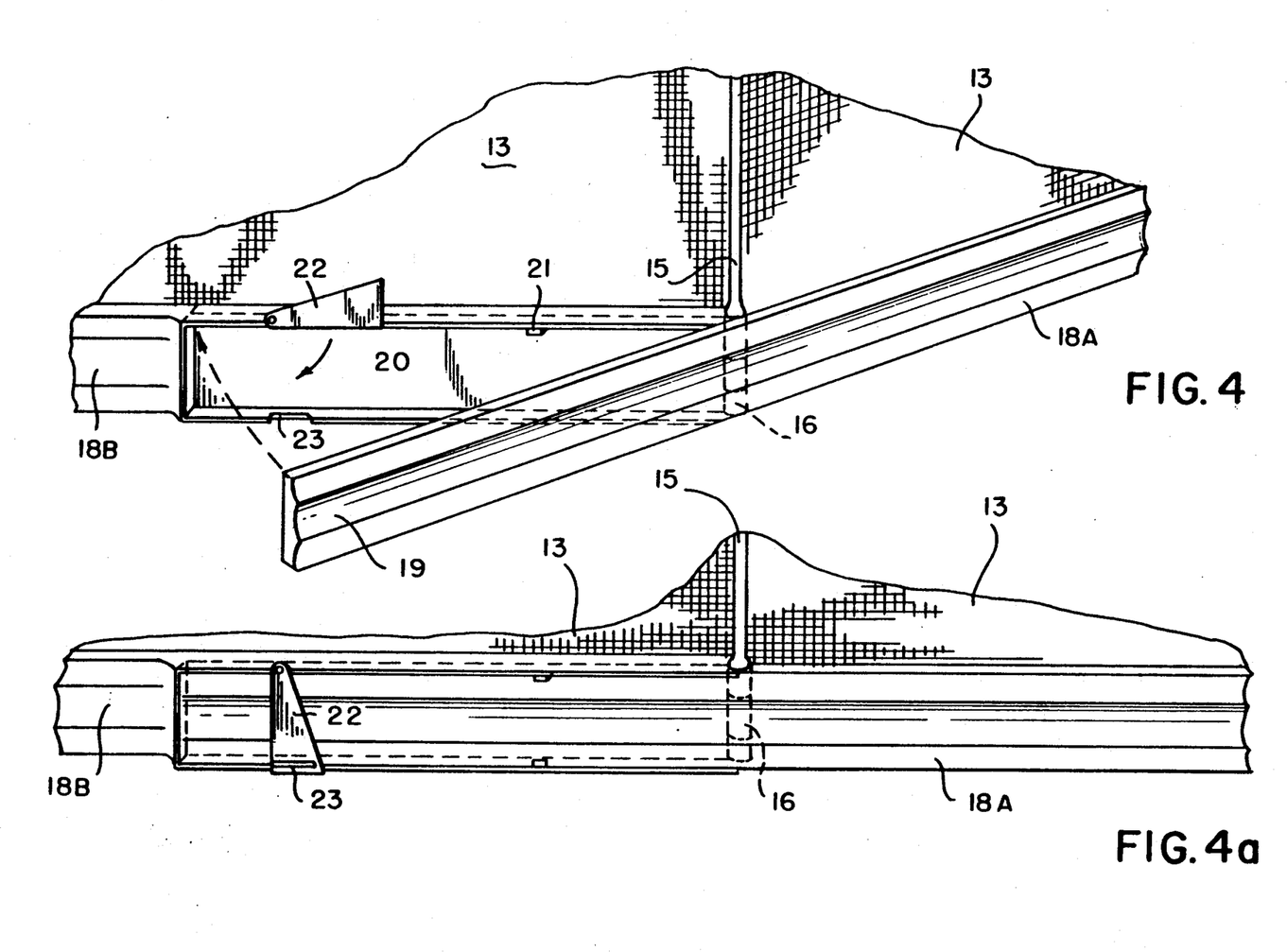
FIG. 4 is a like view but with the sections free to swing.
FIG. 4A is a like view but with the sections held against swinging.
Figure 4B:
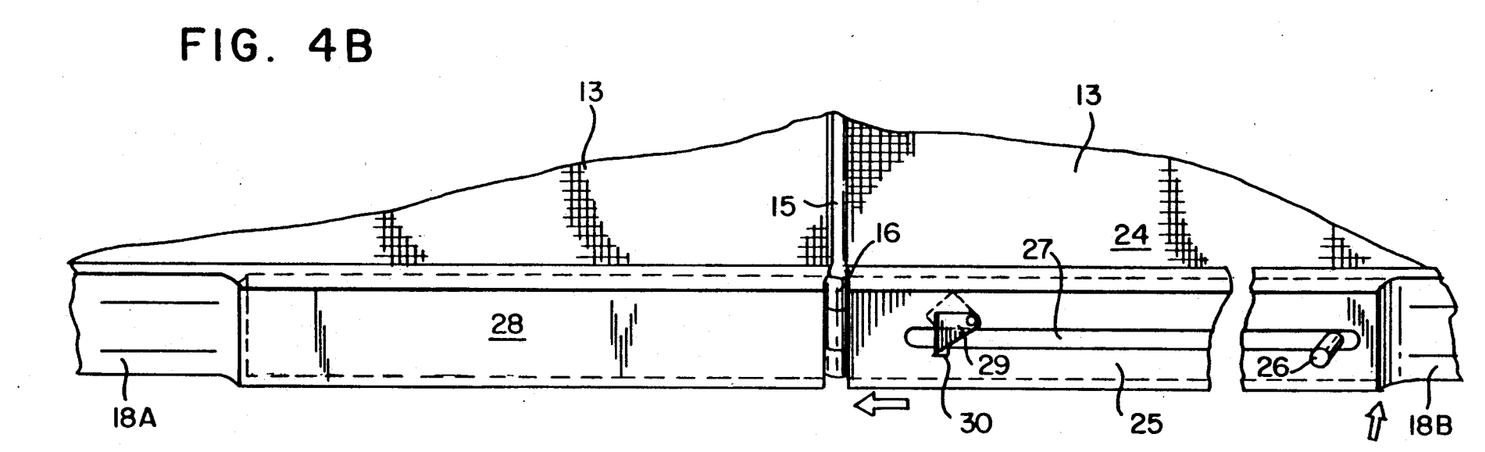
FIG. 4B is a view similar to FIG. 4 but with a batten having a slide positioned to enable the sections to swing.
Figure 4C:
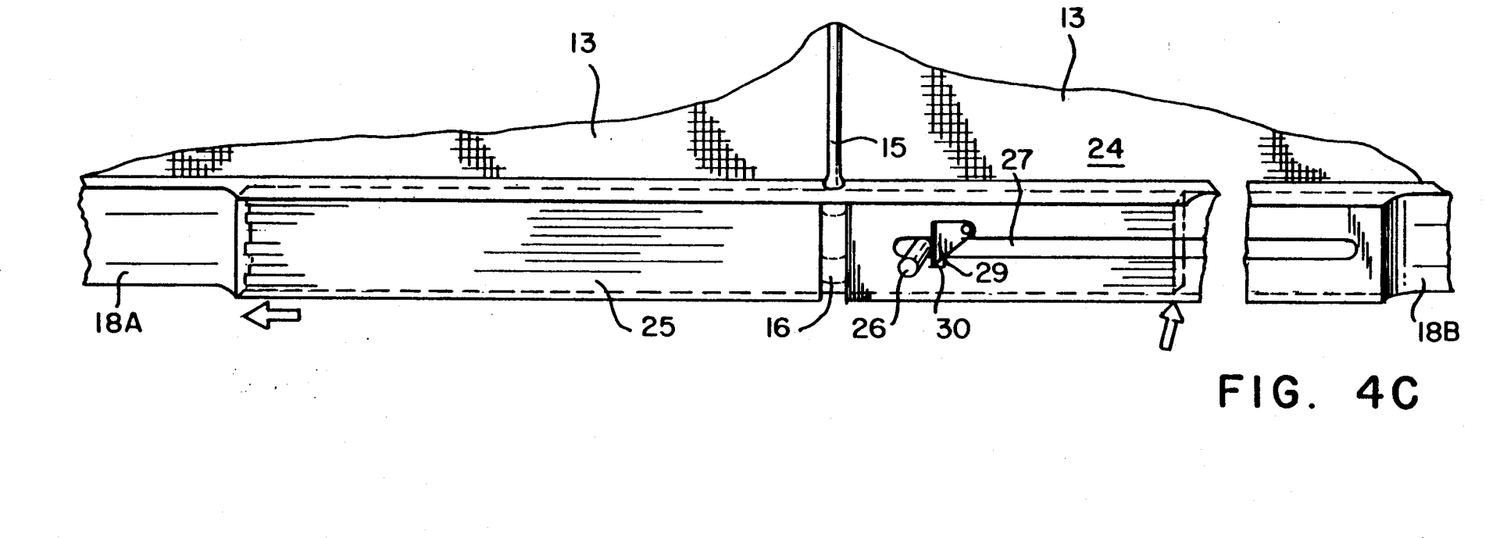
FIG. 4C is another like view but with the slide positioned to straddle a joint then to hold the sections held against swinging.

As best seen in FIGS. 3 and 4, successive ballasting battens 18 are of two types, the battens 18A and the battens 18B. The battens 18A differ from the battens 18B in that each batten 18A has a straight end 19 projecting beyond the rod 15 to which the batten is pivotally connected thus to straddle the joint 16 and when two adjacent sections 10 are swung into line, to enter a channel 20 in the end of the adjacent batten 18B shaped and dimensioned to receive it and the channel 20 is shown as bordered by yieldable catches 21 and as having a pivoted latch 22 positioned to swing downwardly over the batten end 19 and to be held by a catch 23 to provide a positive but releaseable lock between the battens 18A and 18B immobilizing the joint 16.

It will be appreciated that if all ballasting battens 18 have projecting portions, such as the end 19, it would be impossible to fold the boom sections 10 one on another. For that reason, the battens 18B have slideways 24 opening towards a joint 16 and the batten 18A and housing a slide 25 provided with a handle 26 protruding through a slot 27 extending lengthwise of the slideway 24. The slide 25 is shown in FIG. 4 in its retracted position and, when two battens 18A and 18B are in line, the slide 25 may be advanced to straddle the joint 16 and slide into the pocket 28 which extends lengthwise of the proximate end of the adjacent batten 18A. In so doing, the handle 26 engages and cams the pivoted lock 29 away from its stop 30 and out of its path. The pivoted lock 29 then falls back to be held by the stop 30 and the straddled joint immobilized. A boom may be formed with all of its ballasting battens without a protruding portion but it is presently preferred to use both types.

Figure 6:
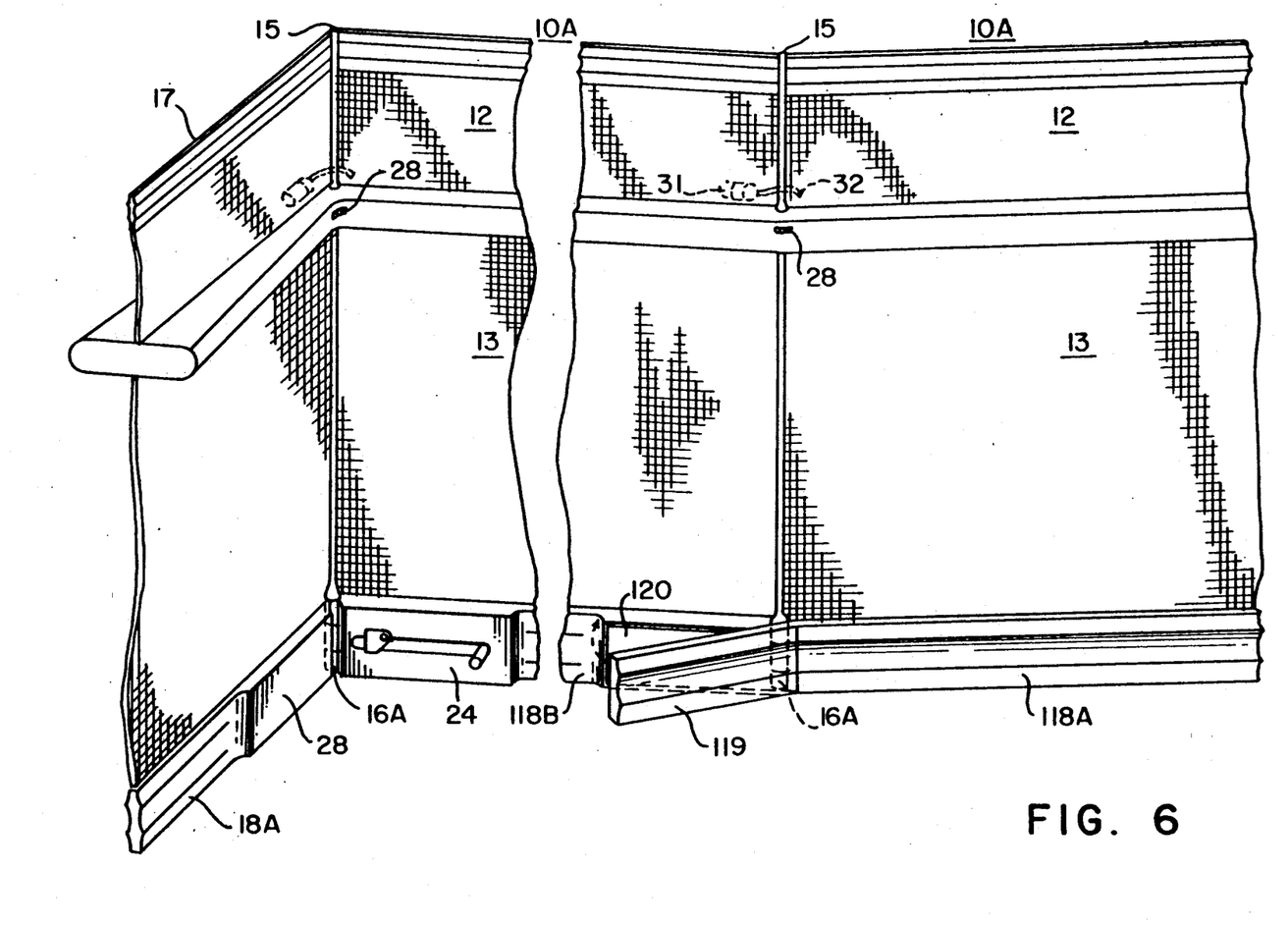
FIG. 6 is a fragmentary section taken transversely of a joint illustrating the use of a batten having an angularly disposed, joint stradding portion.
Figures 7, 7A:
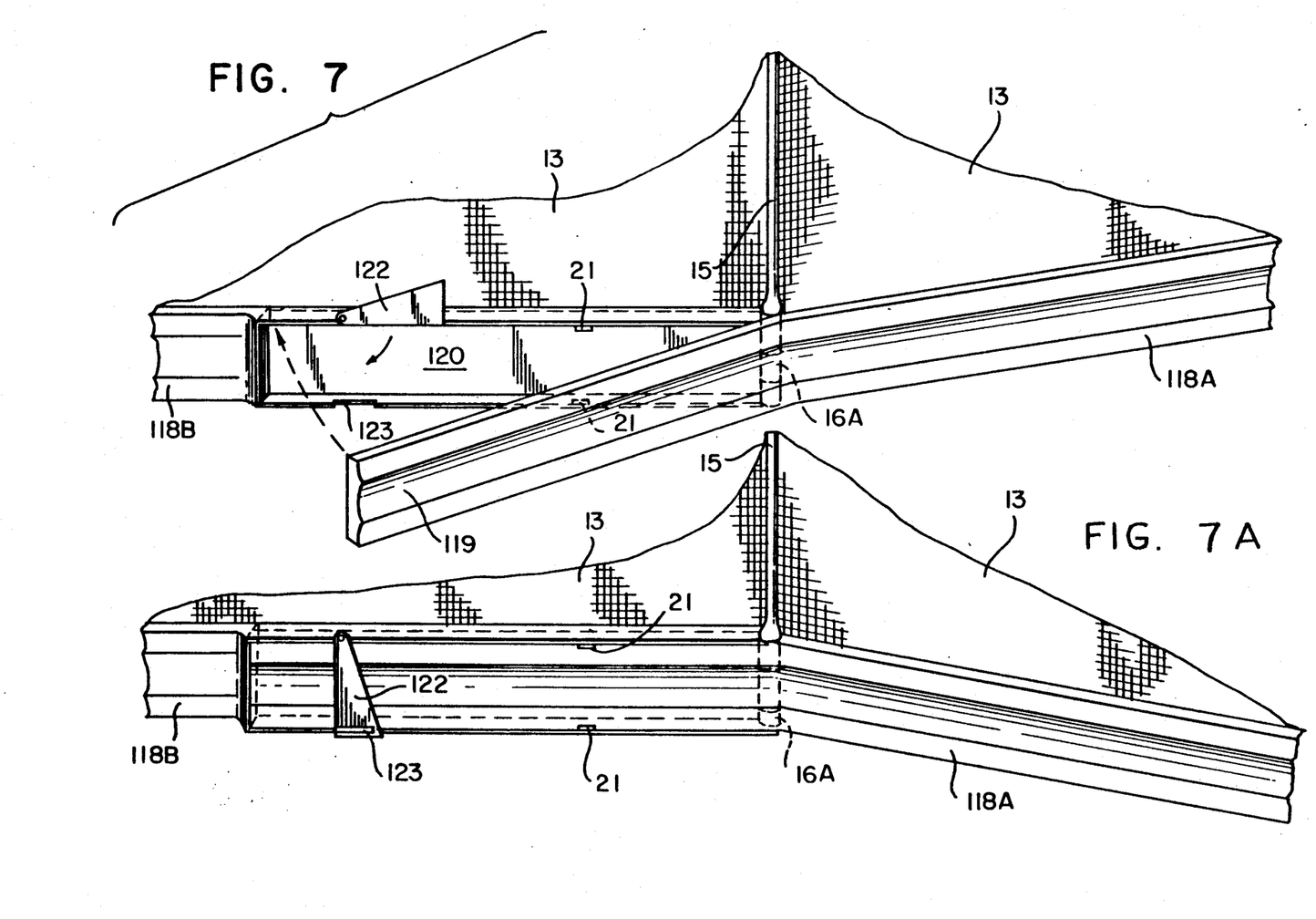
FIG. 7 is a fragmentary view showing the latch and catch by which adjacent battens may be locked together.
FIG. 7A is a like view but with the latch and catch holding the angularly disposed portion to connect adjacent battens.
Figure 8:
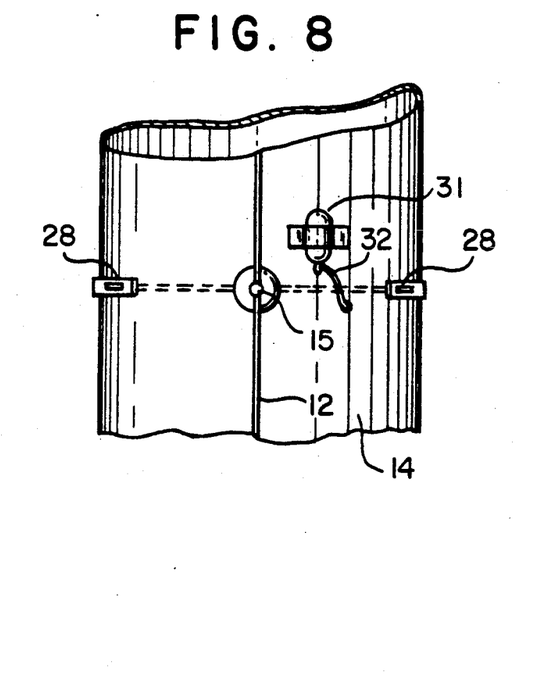
FIG. 8 is a fragmentary plan view of the adjacent ends of the inflatable chambers of a flexible joint.
Figure 9:
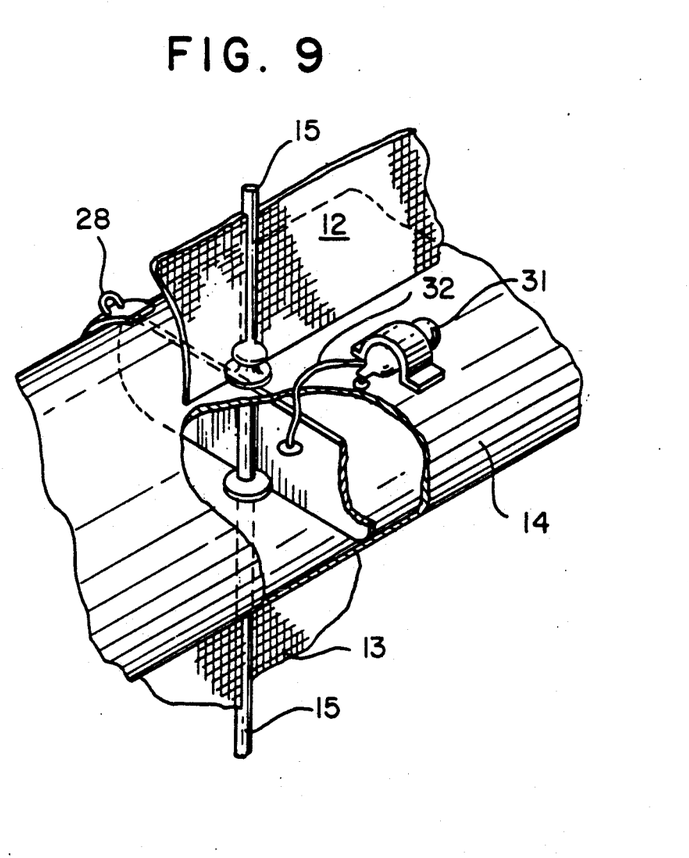
FIG. 9 is a lengthwise section through the chambers of FIG. 8.

In cases where the ballasting battens 18 do not have sufficient flexibility, the two sections 10A joined by a joint 16A have ballasting battens 118A and 118B. As shown in FIGS. 6 and 7, a batten 118A has an angularly disposed end portion 119 inclined, when the boom is in place, towards the tanker 11. The end portion 119 straddles the joint 16A and is engageable by the adjacent end of the batten 118B which is or may be identical to the ballasting battens 18B and, accordingly is not detailed but has its corresponding parts designated by the appropriate reference numerals which are distinguished by the prefix addition "1". The batten end portion 119 is locked in the channel 120 to immobilize the joint 16A by the latch 122 held by the catch 123 and the two associated sections 10A are thus held together at a predetermined angle less than 180° in extent. The use of battens such as the batten 118A makes necessary that each such batten be alternated with one not having a protruding holding portion.

In the disclosed embodiment, each inflatable chamber 14 is provided with a pressurized, valve controlled gas canister 31 which when its valve is open, delivers gas under pressure into its chamber 14 adjacent one end thereof. The valves of the canisters 31 are opened either manually or by gas under pressure. A length of flexible tubing 32 connects the other end of each chamber 14 to the valve of the canister 31 of the section 10 which is next to go overboard. This arrangement allows an operator to pass a series of sections 10 overboard without inflating their chambers 14 and then be inflated one after another when necessary to provide buoyancy by manually opening a canister valve of the section 10 which is next to go overboard.

Figure 5:
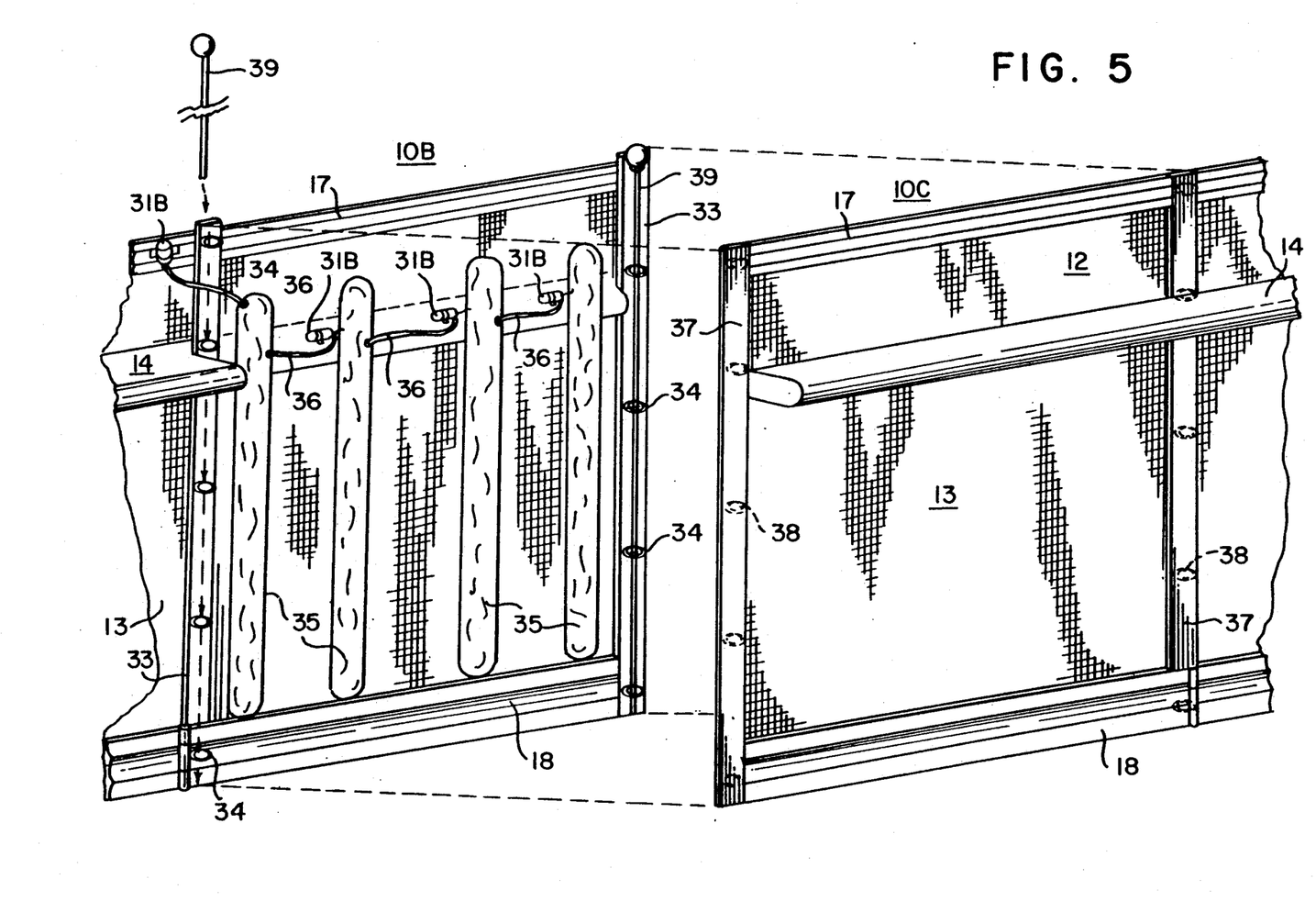
FIG. 5 is a view illustrating the connection of end sections to complete the boom.

The completion of the boom requires that its two ends be connected in a manner preventing leakage between them. As illustrated by FIG. 5, one end section 10B differs from other sections 10 in that its inflatable chamber 14B extends only along the outer side thereof and has on its inner surface, flat supports 33 secured to its side margins. Each support 33 is provided with a vertically spaced series of rings 34. Between the supports 33, there are four, parallel vertical inflatable chambers 35 each of which has a pressurized valve controlled gas canister 31B connected thereto to be inflated thereby when its valve is opened. In the case of the chamber 35 adjacent the section 10 to which it is hinged, the operating canister 31B therefore is mounted on the batten 17 of that section and is connected thereto by a length of flexible tubing 36. The valve of the canister mounted on the batten 17 is manually operated. As the valves of the canisters for the other chambers 35 are pressure operated and as each chamber 35, except the one adjacent the free end of the section 10B, has a length of flexible tubing 36 connected to the canister 31B of the next adjacent chamber 35, the chambers 35 all become successively inflated when the valve of the canister 31B mounted on the batten 17 of the adjacent section 10 is opened.

The other end section 10C has its inflatable chamber 14C only on the interior surface thereof and has flat supports 37 secured to the side edges thereof with the supports 37 secured to the side edges thereof with the supports 37 spaced so that both may be placed against the corresponding supports 33 of the end section 10B. The supports 37 have slots 38 so spaced and dimensioned that the rings 34 will extend therethrough when the supports 37 are seated against the supports 33. Capped rods 39 are then inserted downwardly through the vertically aligned rings 34 interconnecting the section 10B and 10C so that when the chambers 35 are inflated, leakage between the sections is prevented.

Figure 1:
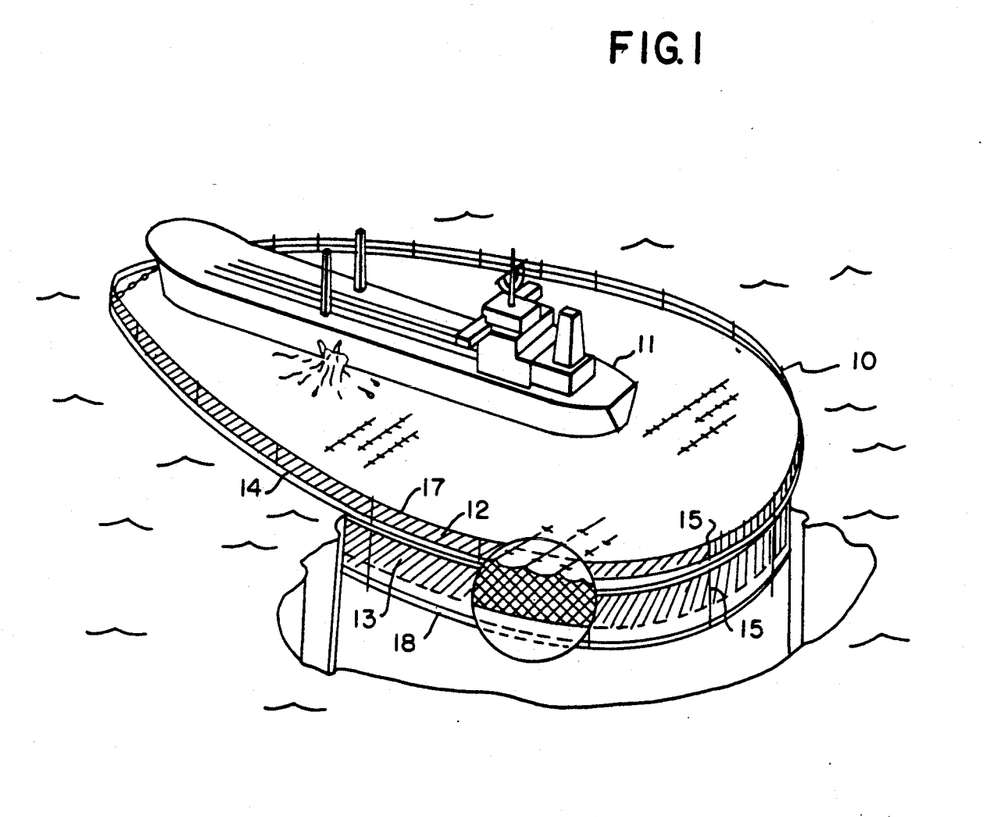
FIG. 1 is a somewhat schematic view illustrating a boom in accordance with the invention surrounding a leaking tanker.
Figure 2:
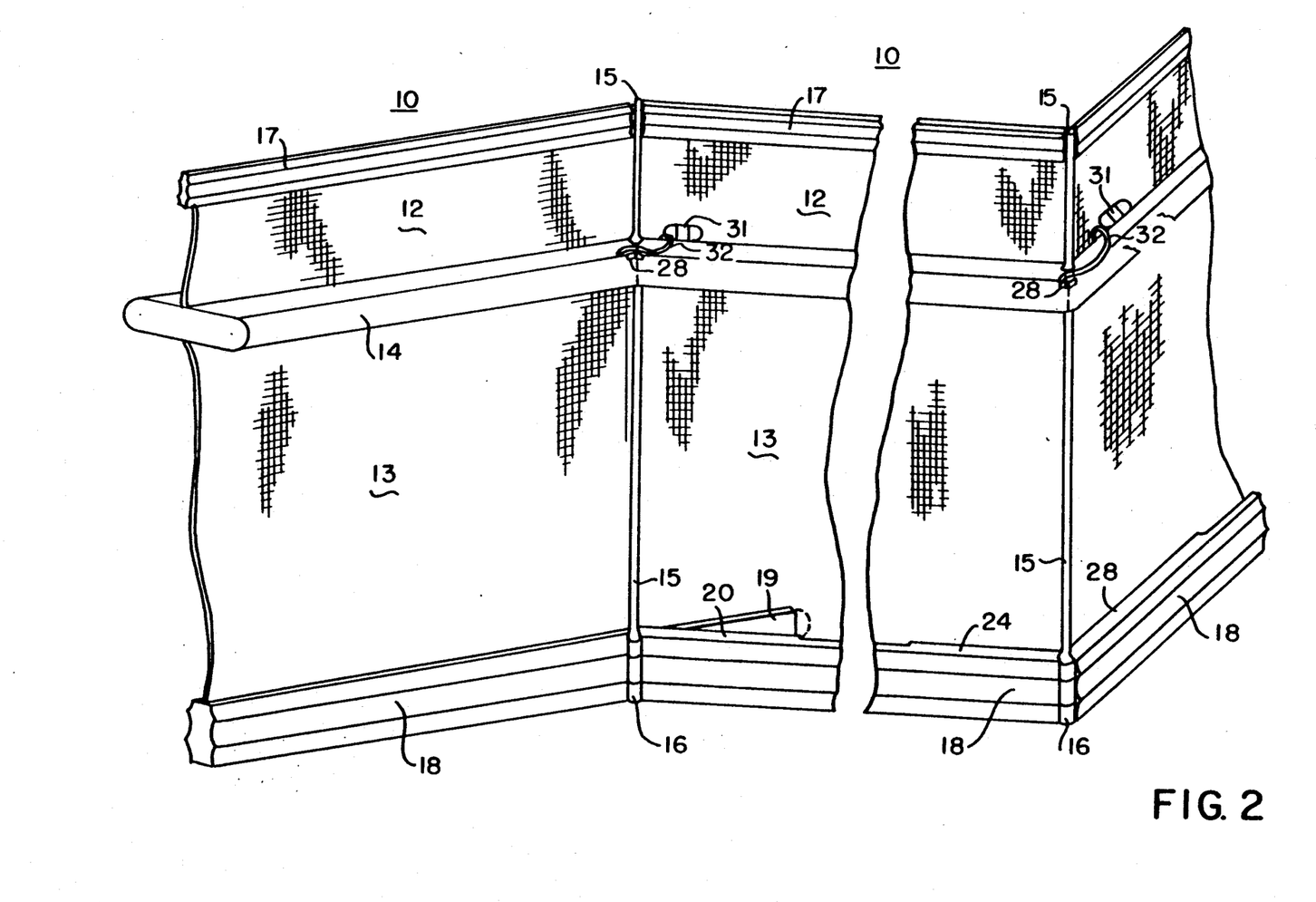
FIG. 2 is a view of several sections of the boom as seen from the outside thereof with the sections free to swing.

From the foregoing, it will be appreciated that booms in accordance with the invention are easily stored and a boom quickly established and disposed to provide an impoundment of adequate volumetric capacity. The boom may be anchored in position or it may, as illustrated by FIG. 1, be held captive only by the leaking tanker.

I claim:

1. An oil containment boom comprising a sufficient number of sections to enable the boom to surround a ship in a spaced relationship thereto, a flexible joint interconnecting adjacent sections in a manner enabling the boom to be stored with the sections folded, one on another, each section including an oil impervious, flexible barrier in sheet form, an inflatable tubular chamber closed at its ends and extending lengthwise of the barrier to establish upper and lower portions thereof, each flexible joint including a rod to which the ends of adjacent barriers are sealed, top and bottom self supporting battens extending lengthwise of the top and bottom margins of the barrier portions and pivotally connected to corresponding ends of the adjacent rods, the bottom battens of a weight such that they serve as ballasting battens and the top battens relatively light in weight, means operable to inflate the chambers, means operable to interconnect the end sections to complete the boom, and means operable to immobilize the joint between each two sections with a predetermined angular relationship between the adjacent ends of the ballasting battens whereby the boom, when in place, has a relatively stable form.

2. The oil containment boom of claim 1 in which the battens are sufficiently flexible to bend slightly between the immobilized joints.

3. The oil containment boom of claim 1 in which the joint immobilizing means are of first and second types, the angular relationship established by the first type is 180° and the angular relationship established by the second type is obtuse.

4. The oil containment boom of claim 3 in which the first type of joint immobilizing means includes a slideway extending lengthwise of one end of one of the ballasting battens on the side thereof disposed towards the ship, a slideable portion is held by the slideway and is of a length to be slid past the joint and into holding engagement with the other ballasting batten.

5. The oil containment boom of claim 4 and means to lock the slideable portion against movement when in its holding position.

6. The oil containment boom of claim 5 in which said other ballasting batten has a lengthwise pocket in the plane of the slideway when the two sections connected by the joint are coplanar, the pocket dimensioned to receive and hold the advanced end of the slideable portion.

7. The oil containment boom of claim 6 in which the slideable portion has a stud, the first named slideway has a lengthwise slot having forward and rearward ends, the stud extends through the slot and is exposed adjacent the rearward end of the slot in the inoperative position of the slideable portion, a lock is pivotally connected to the slideway above the slot adjacent the forward end thereof, a seat is fixed on the slideway below the lock normally engaged thereby, and the lock is disposed to be engaged by the stud when advanced to position the slideable portion in the pocket and then raising the lock until the stud passes thereunder to permit the lock again to drop into contact with the seat.

8. The oil containment boom of claim 3 in which the second type of immobilizing means includes an angularly disposed portion protruding from one end of one ballasting batten, the angularly disposed portion of a length to straddle the joint and come in contact with the other ballasting batten when the sections swing towards each other and the ship to a predetermined extent.

9. The oil containment boom of claim 8 in which means are provided to connect the angularly disposed portion to said other ballasting batten.

10. The oil containment boom of claim 9 in which the ballasting batten of said other section has a seat dimensioned to accommodate the angularly disposed portion.

11. The oil containment boom of claim 10 in which the margins of the seat have yieldable detents operable to hold the angularly disposed portion in the seat.

12. The oil containment boom of claim 9 in which a latch is pivotally connected to the upper margin of the seat, a catch is attached to the lower margin thereof to receive the latch after the latch has been raised to permit the angularly disposed portion to engage the seat.

13. The oil containment boom of claim 3 in which the two types of joint immobilizing means are employed in the alternative throughout the length of the boom.

14. The oil containment boom of claim 1 in which each section includes a unit charged with gas under pressure and provided with a valve which when opened inflates the associated chamber, the valves manually operable and also by gas under pressure whereby the sections may be deployed overboard, one at a time with their chambers deflated and then inflated in series by manually operating the valve in control of the inflation of the next section to go overboard.

15. The oil containment boom of claim 1 in which the means by which the end sections are connected comprise means to connect the two end sections in face to face contact, inflatable chambers on the outer surfaces of each end section in communication with the chamber of the adjacent section, and inflatable sealing means between the sections.

16. The oil containment boom of claim 15 in which the means connecting the end sections include vertical supports on the proximate faces of the two end sections with corresponding supports positionable in mutual contact, the vertical supports of one section provided with a vertical spaced series of eyes, the vertical supports of the other section having similarly spaced slots dimensioned to receive and expose the eyes, when corresponding supports are in mutual contact and a headed rod extending downwardly through each series of eyes to lock the end sections together.

17. The oil containment boom of claim 15 in which the inflatable sealing means includes a series of parallel vertical, inflatable baffles attached to one end section, and means to inflate the baffles.

18. The oil containment boom of claim 17 in which the baffle inflating means includes a unit, one for each baffle and charged with gas under pressure, each unit provided with a valve which when opened releases gas into the associated baffle, the valves operable manually or by gas under pressure received from the next adjacent inflated baffle.

19. The oil containment boom of claim 18 in which the unit which is to be manually operated is attached to the boom section next to said one end section.

* * * * *